Feb. 6, 1934.  F. STRUCKMEYER  1,946,006
UNIVERSAL WEEDING IMPLEMENT
Filed July 18, 1932
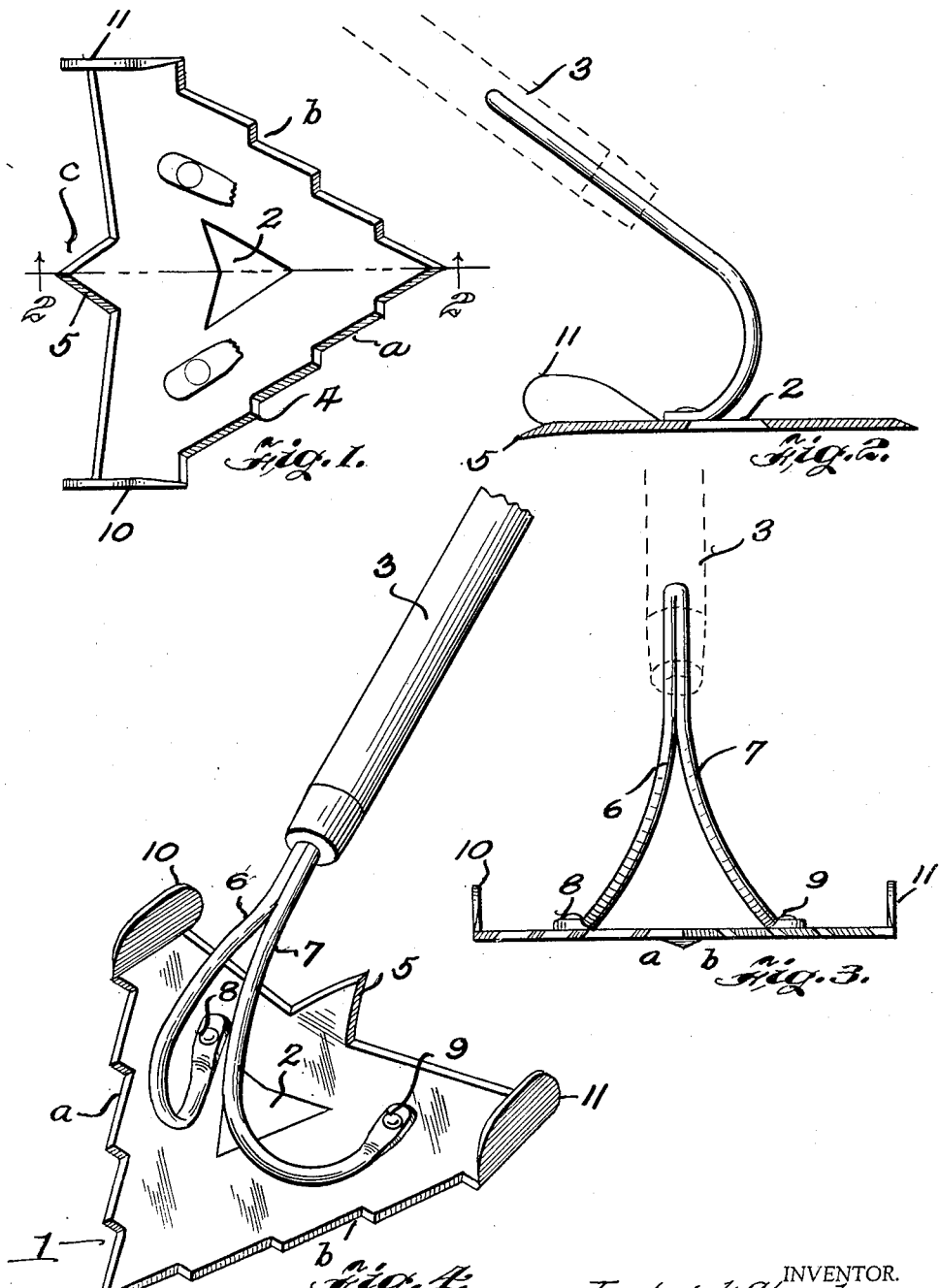
INVENTOR.
Frederick Struckmeyer,
BY John M. Spellman
ATTORNEY.

Patented Feb. 6, 1934

1,946,006

UNITED STATES PATENT OFFICE 1,946,006

UNIVERSAL WEEDING IMPLEMENT

Frederick Struckmeyer, Dallas, Tex.

Application July 18, 1932. Serial No. 623,190

2 Claims. (Cl. 97—68)

This invention relates to certain new and useful improvements in universal hoes or weeders. It is therefore the primary purpose of the invention to facilitate the cutting of weeds.

The hoe herein described is particularly adaptable to work in corn and cotton fields. As will be made clear there are three principal cutting edges, the hoe being of triangular shape. In addition there is provided a triangular hole in the center of the implement applicable to certain kinds of work and providing a means for sloughing off loose dirt which accumulates on the top of the cutter.

A further feature is the provision of two shields or guards on either end of the base of the triangular hoe. The object of these guards is to protect plants which are to be left standing. The corn or cotton plants can therefore be freed from weeds without injuring the plants.

With these and other objects in view the invention is illustrated in the accompanying drawing wherein:

Figure 1 is a plan view of the hoe, shown without the handle.

Figure 2 is a cross sectional view taken at 2—2, illustrating by dotted lines how the handle may be attached.

Figure 3 is a front view of the hoe.

Figure 4 is a perspective view of the hoe showing the various aspects of the invention.

The nature of the invention will be better understood by referring more in detail to the drawing, wherein corresponding parts in the several figures are denoted by like characters of reference.

The principal member of the device is the triangular cutter 1 shown in Figure 1. The handle 3 is illustrated in Figures 2, 3, 4.

As can be seen the cutter 1 is triangular with modified teeth 4 shown on the two sides $a$ and $b$. The tooth extending from the rear of the blade is to be considered a full tooth and the teeth along the other two sides are indicated as modified teeth. Modified teeth is used to indicate limited and changed in size and shape from the full tooth. The base of the cutter $c$ has a triangular tooth 5 bending downwards which enables the operator to cut deeper by pulling backwards. The rear of the blade is beveled to form cutting edges and the cutting edges may be said to be forwardly inclined toward the center of the blade. The cutter is further provided with guards 10 and 11 placed on either side of the base $c$. A cutter thus results which has three cutting edges as well as a center opening also sharpened or beveled. This triangular hoe is shown at 2. On either side of the opening 2 rise the prongs 6 and 7 which merge into the handle 3. The handle 3 is attached by means of screws 8 and 9 which are riveted into the cutter member 1.

A hoe of this character can be used in the hand but it operates best when a handle is attached. The weeder can be pulled back, pushed forward, etc., according to the nature of the work.

This improved hoe thus affords a hoe with three cutting sides and a cutting center. Destruction of plants is guarded against by furnishing two shields at either end of the base which serve to protect the plants. The invention demonstrates the complete utilization of a triangular blade providing sharp edges at all possible and proper places and insuring perfect cutting by means of sharpened or teethed edges.

What I claim as new is:

1. In a weeding implement a triangular blade having two of its sides with modified cutting teeth, the rear side beveled to produce a cutting edge entirely across the rear, guards on two sides of said blade, said guards terminating adjacent the first modified tooth near the rear side of the blade, a centrally disposed triangular shaped incision to facilitate removal of loose earth from the top of the blade, a resilient looped prong with diverging ends secured to said blade and having a shank to be fitted to a handle, and a handle.

2. A horizontal weeding implement, comprising a triangular working blade, a handle, a shank having resilient looped prongs carried by the handle connecting the handle to the triangular working blade, the triangular blade having two of its sides with at least two modified teeth, a rear side divided into two forwardly inclined portions, having edges bevelled to produce a cutting edge and having a downwardly inclined cutting tooth, a centrally disposed triangular shaped incision in the blade and guards formed integrally with said blade, extending from the lateral sides intersecting the rear portions.

FREDERICK STRUCKMEYER.